March 20, 1956 — H. W. HART — 2,738,765
AUTOMATIC FLEXIBLE CONVEYOR POULTRY FEEDER
Filed July 1, 1952 — 2 Sheets-Sheet 1
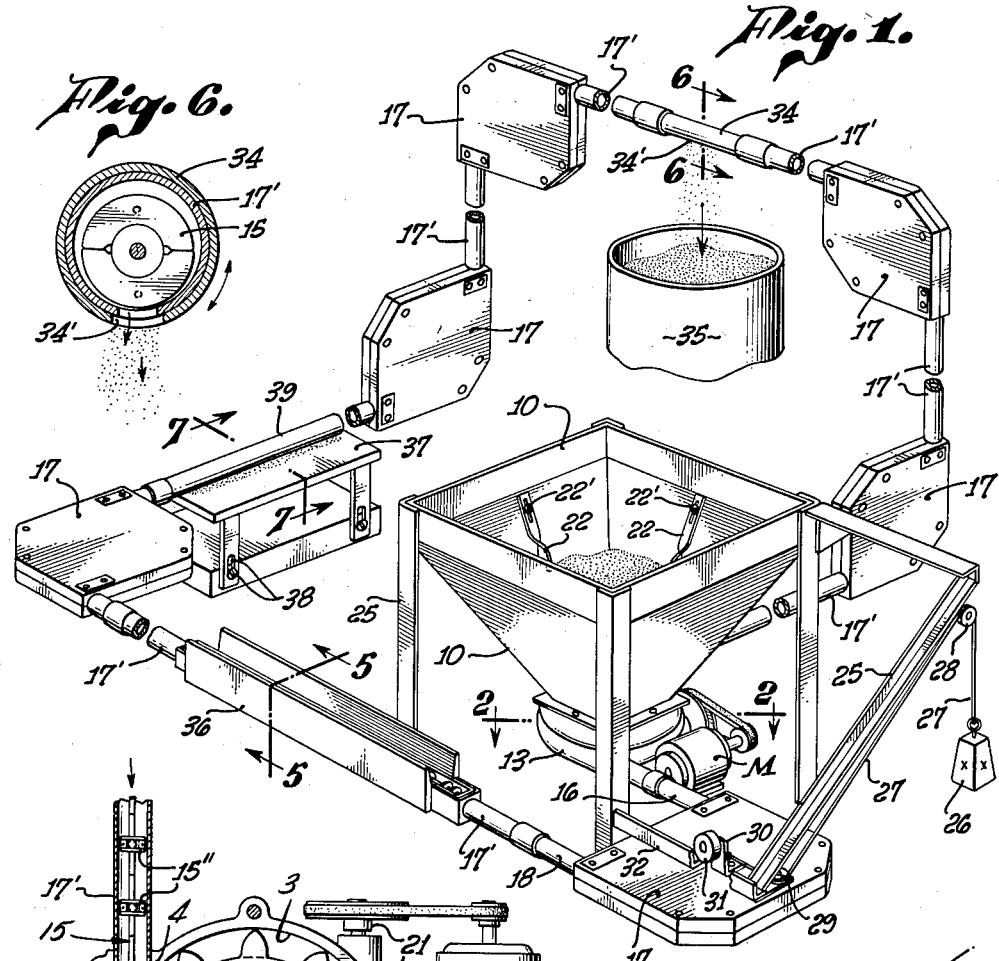
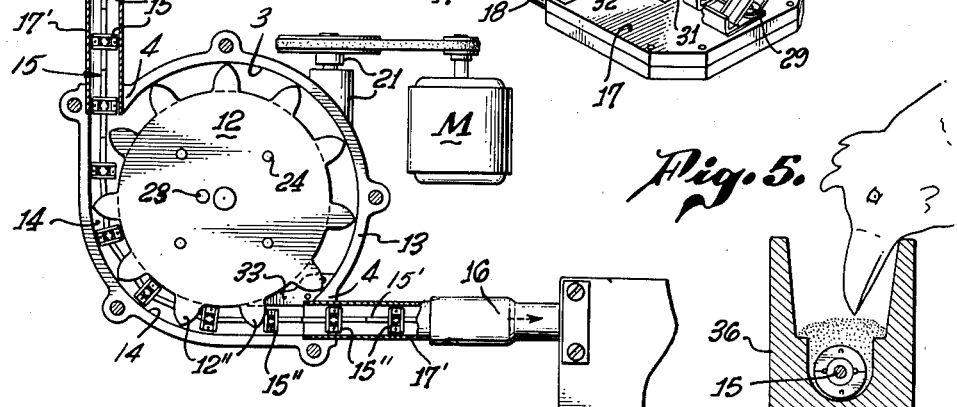
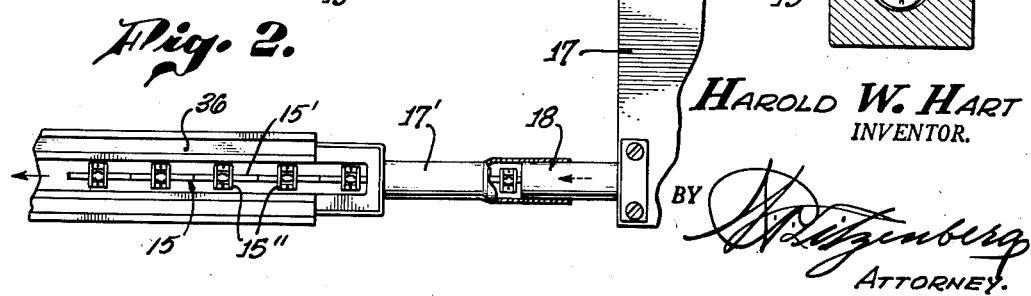
Harold W. Hart
INVENTOR.
BY
ATTORNEY.

March 20, 1956 — H. W. HART — 2,738,765
AUTOMATIC FLEXIBLE CONVEYOR POULTRY FEEDER
Filed July 1, 1952
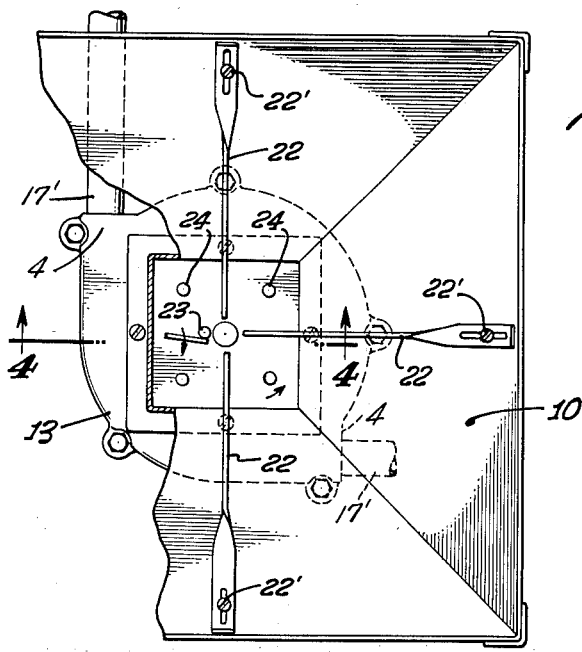
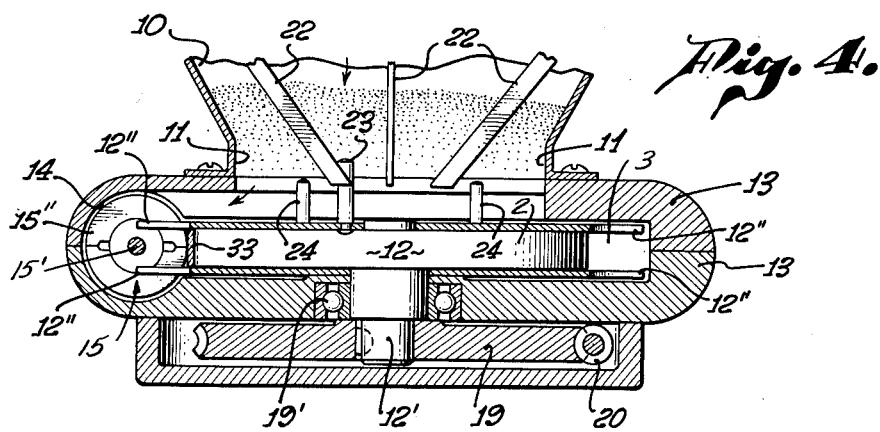
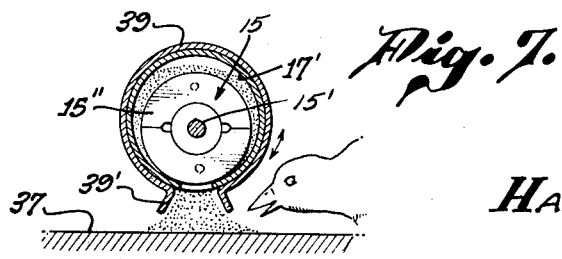
HAROLD W. HART,
INVENTOR.

United States Patent Office 2,738,765
Patented Mar. 20, 1956

2,738,765

AUTOMATIC FLEXIBLE CONVEYOR POULTRY FEEDER

Harold W. Hart, Glendale, Calif.

Application July 1, 1952, Serial No. 296,661

7 Claims. (Cl. 119—52)

This invention relates to automatic flexible conveyor poultry feeders, and more particularly to feeding systems in which loose material is conveyed through tubes and troughs from a source of supply to various pens and places where the actual feeding takes place.

This is accomplished by means of a flexible conveyor system similar to that shown and described in my pending application Serial No. 283,573.

Among the salient objects of the present invention are:

To provide a complete system for automatically conveying loose feed materials from a source of supply, such as a bin or hopper, to the place of feeding;

To provide in connection therewith a suitable bin or hopper with means therein for gradually feeding said material to the conveyor system, to be carried to the places for feeding poultry and the like;

To provide an automatic feeding system of the character referred to which will not only carry or convey said loose material in a horizontal system, but will move said material to different levels, as to upper floors in a building, whereby a more extensive system is made possible;

To provide such an automatic feeding system with simple and efficient means for agitating the material in the bin or hopper, and for gradually feeding it into the conveyor system, to be carried to the different places for feeding.

Other objects and advantages of the invention will appear from the following more detailed description of one embodiment of the system, taken with the accompanying two sheets of drawings, which I will now describe:

Figure 1 is a perspective view of a compact system illustrating one practical embodiment of my invention, with parts broken out to reduce the size of the figure;

Figure 2 is an enlarged, fragmentary view, taken at the horizontal section line 2—2 on Fig. 1, at the place where the feed is fed from a hopper to the conveyor system, indicating how said feed is picked up in small amounts by the conveyor;

Figure 3 is a plan view looking down into a hopper with parts broken away, and showing agitating means in said hopper;

Figure 4 is a vertical sectional view, taken at the position of line 4—4, on Fig. 3;

Figure 5 is a vertical sectional view through a feed trough, at line 5—5, Fig. 1;

Figure 6 is an enlarged sectional view through a conveyor tube, at the position of line 6—6, Fig. 1, showing one method of emptying the conveyor tube; and Figure 7 is a sectional view on line 7—7, Fig. 1, showing how feed can be discharged at a position along a tube for feeding chicks on a floor or platform.

Referring to the drawings in detail, the present, improved poultry feeding system includes a hopper 10 which has downwardly converging side walls and an open top through which loose feed material may be poured into the hopper. As shown in Fig. 4, the lower apex end of the hopper is provided with a discharge opening 11 through which the loose feed may flow downwardly from the hopper.

Mounted against the lower flanged end of the hopper 10 is a relatively flat, generally circular housing composed of two mating parts 13 suitably secured together to provide a circular chamber in which a sprocket 12 is rotatable on a vertical axis. As shown in Figs. 2 and 4, the sprocket 12 has upper and lower plates 12″ formed with widely spaced sprocket teeth having curved sides. Interposed between the plates is a cylindrical body 2 of a diameter substantially equal to the root diameters of the sprocket plates 12″. The periphery of the body 2 and the inner circular surface of the housing define between them an annular space 3 through which the sprocket teeth revolve. The housing has a pair of right-angularly related, bored bosses 4 which are tangential with the annular space 3. The portion of the space 3 extending through a quarter circle between the bosses 4 is hereinafter referred to as an arcuate passageway 14. Loose food material entering the housing 13, 13 from the hopper 10 flows into the passageway 14, as indicated by the arrow in Fig. 4.

Adapted to travel through the passageway 14 is a flexible conveyor 15 having longitudinally-spaced pusher elements 15″ joined by swivel joints to connecting links or stems 15′. The conveyor 15 is advanced through the passageway 14 through the medium of the sprocket 12, whose teeth engage the pusher elements 15″. It is to be noted that the spacing of the teeth is greater than the spacing of the pusher elements. By this provision, only one tooth of the sprocket 12 engages a pusher element at any time, as clearly shown in Fig. 4. This minimizes friction between these interengaging parts.

Held in the bosses 4 are the ends of tube sections 17′ which are two of many such sections forming part of the closed system of conveyor tubes shown in Fig. 1. As the conveyor 15 moves through the passage 14, it travels through the short tube section 17′ shown at the right-hand side of the housing 13 and thence through tube 16 carried by a so-called "turn block" or casing 17. The conveyor 15 then travels around a grooved idler pulley (not shown) within the turn block where its direction of travel is reversed so that the conveyor moves outwardly through a tube 18 carried by the turn block 17 and thence into another tube section 17′ of the closed system, the latter including a turn block 17 at each right-angular turn of the conveyor system.

The specific form of articulate conveyor 15 is disclosed and claimed in my pending patent application, Serial No. 283,573, referred to above, said application also illustrating and claiming the turn block structure. These elements of the poultry feeding system are, therefore, not described in detail in the present application.

As shown in Fig. 4, the sprocket 12 has a hub extension 12′ rotatable in a ball bearing 19′. Carried by the extension 12′ is a worm wheel 19 which is driven from a worm 20 driven from an electric motor M, through means indicated at 21 in Fig. 2. Thus, when the motor M is operated, the sprocket 12 is rotated to push the flexible conveyor 15 through the closed system of tubes so as to push the loose feed therethrough. Each of the turn blocks 17 has a curved passageway therein which is of circular cross-section, the conveyor traveling around the idler pulleys and pushing the feed ahead throughout all portions of the system.

A simple and practical means is provided within the hopper 10 for agitating the feed material so as to avoid packing thereof. This agitator means consist of spring arms 22 having upper arms adjustably secured at 22′ against the upper portions of the side walls of the hopper. The lower free ends of the inclined spring arms 22 terminate at the discharge opening 11, in position to be engaged by a striker element 23 carried by the sprocket 12 and arranged eccentrically of the axis thereof. When the sprocket is rotated, the element or pin 23 successively engages and flexes the arms 22 until they slip from the pin to assume their normal positions, this flexing action of the arms acting to agitate the feed material in the hopper. Shorter pins or studs 24 are also carried by the rotary sprocket and these act to stir the feed material resting upon the sprocket. Thus, the material is maintained loose for effective feeding to the flexible conveyor in the passageway 14.

The invention contemplates the provision of means for maintaining the conveyor 15 relatively taut. This means includes a stationary frame structure 25 (Fig. 1). A cable 27 extends over pulleys 28 and 29 and has one end connected to an upstanding lug 30 on the turn block 17 associated with the sprocket housing 13. A roller 31 on the lug 30 runs along a fixed angle-iron or track 32 so that the turn block 17 is drawn yieldingly outwardly under the influence of a weight 26 to increase the tension of the flexible conveyor 15. The tubes 16 and 18 of the turn block 17 are telescopically connected to the tubes 17', as shown in Fig. 2 to permit such movement of the turn block relative to the conveyor system as a whole.

Referring now to Fig. 2, which is a plan view of the sprocket 12 which receives the loose material from the hopper 10, I install a sort of stripper element 33, of wedge shape, in position to engage and move each pusher element 15" from the effective tooth of said sprocket 12 as clearly indicated at 12" in Fig. 2, as said tooth moves away from the conveyor. Said sprocket 12 has upper and lower teeth, in pairs, as seen in Fig. 4, and said stripper is positioned between the upper and lower teeth of each pair.

As one means for conveniently emptying loose feed material from the circulating tube system, I provide a sleeve 34 (Fig. 6), having a slot 34' therein. When the sleeve is turned, its slot 34' registers with an opening in the tube 17 so as to permit the feed carried along therein by the flexible conveyor, to be discharged therethrough and to drop into a receptacle or another hopper, as at 35, placed to receive it. Such a discharge sleeve can be arranged on the conveyor tubes at any desired location.

In Figs. 1, 2 and 5, I have shown an open trough, designated 36, with the conveyor 15 moving along the bottom thereof, as indicated in Fig. 5, and showing how a chicken can reach down into the trough and eat from the feed being moved along therein.

An important feature of the invention resides in the fact that the flexible conveyor 15, as it moves to and around the sprocket 12 has a certain looseness or play between the teeth of the sprocket and the pusher element 15" of the conveyor, only one of the teeth of said sprocket 12 being in actual engagement with a coupler element 15" of the conveyor for moving it. It will be noted that the pusher elements of the conveyor move on to the sprocket between the teeth thereof, and are not in continuous mesh of contact therewith. This provides flexibility in the conveyor which would not be possible if the coupling elements meshed with the teeth in the manner of a chain and sprocket drive.

Referring to Fig. 7, a tubular cover 39 surrounds the tube section 17' which extends across the table or platform 37. The tubular cover 39 has its lower portion slotted longitudinally to adapt the slot to register with a longitudinal opening in the lower portion of the tube 17'. The tubular cover 39 is rotatable on the tube 17' so that the opening in the tube section 17' may be selectively opened or closed to allow flow of the feed material from the tube section onto the platform or to shut off such flow. As shown, the edges of the slot in the outer tube 39 are flared outwardly to provide guards 39' for preventing entrance of the chickens' beaks into the opening of the tube section 17'.

I do not limit my invention to the details of construction and arrangement shown for explanatory purposes, except as I may be limited by the hereto appended claims forming a part of this application.

I claim:

1. An automatic poultry feeding system, comprising: a hopper for holding loose feed material and having a lower, open discharge end; a relatively flat, circular housing secured across said discharge end and having an opening in its upper face communicating with the interior of said housing to receive loose feed material therefrom; a sprocket wheel rotatable on a vertical axis and concentric within said housing, said sprocket having widely spaced teeth; driving means for rotating said sprocket within said housing, the root diameter portion of said sprocket and the inner circular wall of the housing defining between them an annular space through which the sprocket teeth travel, a portion of said space being of circular cross-sectional shape and providing a passageway of arcuate outline, said housing having angularly-related openings in its sides, said openings being tangential to said arcuate passageway, a closed system of tubes having its ends disposed in said angular openings; and a flexible, articulate conveyor movable through said passageway and system of tubes for conveying loose material from the passageway through said tube system, said conveyor having longitudinally-spaced, disc-like pusher elements operative to push the loose material through the system, said sprocket having driving engagement with successive pusher elements of said conveyor, the circumferential spacing of said teeth being greater than the longitudinal spacing of said pusher elements so that driving engagement is effected between only one tooth and a pusher element at a time.

2. A feeding system as defined in claim 1 in which said pusher elements have flat, trailing sides, and in which said teeth of said sprocket have curved sides engageable with said flat, trailing sides.

3. A feeding system as defined in claim 1 in which said sprocket comprises an upper plate, a lower plate and an intermediate cylindrical body, said upper and lower plates having said sprocket teeth on their peripheries, the diameter of said intermediate body being substantially equal to the root diameters of said plates.

4. A feeding system as defined in claim 1, including a wedge-shaped stripper element located at the juncture of said annular space and the end of said passageway from which said conveyor feeds from said sprocket housing, said stripper element being engageable between said sprocket and the pusher element being advanced thereby so as to separate the pusher element from the sprocket tooth engaging the same.

5. A feeding system as defined in claim 1 which includes a stirrer element carried by and projecting upwardly from said sprocket, said stirrer element being arranged eccentrically of the axis of said sprocket and extending upwardly through said open discharge end into said hopper so that rotation of the stirrer element agitates the loose feed material in said hopper.

6. A feeding system as defined in claim 1 which includes at least one resilient agitator arm having one end secured to the hopper adjacent the upper open end thereof and having a lower, free end disposed within said open discharge end, and at least one striker carried by said sprocket and projecting upwardly therefrom to engage said free end of said agitator arm so as to flex the same during rotation of said sprocket.

7. A feeding system as defined in claim 1 in which said closed system of tubes includes a turn block through which said flexible conveyor travels through an arc, means mounting said turn block for bodily movement toward and away from another, fixed, portion of said system of tubes, and tensioning means operatively connected to said turn block and normally operative to yieldingly draw said turn block in a direction away from said fixed portion of said tube system so as to tension said flexible conveyor.

References Cited in the file of this patent

UNITED STATES PATENTS

| | | |
|---|---|---|
| 853,652 | Steele | May 14, 1907 |
| 2,081,947 | McCornack | June 1, 1937 |
| 2,141,815 | Kelly | Dec. 27, 1938 |
| 2,563,321 | Dugan | Aug. 7, 1951 |
| 2,589,690 | Graetz | Mar. 18, 1952 |
| 2,589,706 | Kitson et al. | Mar. 18, 1952 |
| 2,646,023 | Virgil | July 21, 1953 |

FOREIGN PATENTS

| | | |
|---|---|---|
| 73,734 | Germany | Sept. 10, 1917 |

OTHER REFERENCES

The Buckeye E-Z Automatic Poultry Feeder, Aug. 1950, published by the Buckeye Incubator Company, Inc., of Springfield, Ohio.

Big Dutchman Automatic Poultry Feeder, Jan. 17, 1951, published by the Automatic Poultry Feeder Co. of Zeeland, Michigan.